United States Patent
Lee et al.

(10) Patent No.: US 7,657,692 B2
(45) Date of Patent: Feb. 2, 2010

(54) HIGH-LEVEL BRIDGE FROM PCIE TO EXTENDED USB

(75) Inventors: Charles C. Lee, Cupertino, CA (US);
David Q. Chow, San Jose, CA (US);
Abraham C. Ma, Fremont, CA (US);
Frank Yu, Palo Alto, CA (US);
Ming-Shiang Shen, Taipei Hsien (TW);
Horng-Yee Chou, Superior, CO (US)

(73) Assignee: Super Talent Electronics, Inc., San Jose, CA (US)

( * ) Notice: Subject to any disclaimer, the term of this patent is extended or adjusted under 35 U.S.C. 154(b) by 105 days.

(21) Appl. No.: 11/926,636

(22) Filed: Oct. 29, 2007

(65) Prior Publication Data
US 2008/0065796 A1 Mar. 13, 2008

Related U.S. Application Data (63) Continuation-in-part of application No. 11/864,696, filed on Sep. 28, 2007, and a continuation-in-part of application No. 11/624,667, filed on Jan. 18, 2007, which is a continuation-in-part of application No. 10/854,004, filed on May 25, 2004, application No. 11/926,636, which is a continuation-in-part of application No. 10/708,096, filed on Feb. 9, 2004, now Pat. No. 7,130,958, and a continuation-in-part of application No. 10/707,138, filed on Nov. 22, 2003, now abandoned.

(51) Int. Cl.
*G06F 13/00* (2006.01)
(52) U.S. Cl. .................. 710/315; 710/306; 710/313
(58) Field of Classification Search .............. 710/315, 710/306, 313
See application file for complete search history.

(56) References Cited

U.S. PATENT DOCUMENTS

| | | | |
|---|---|---|---|
| 6,334,793 B1 * | 1/2002 | Amoni et al. | 439/680 |
| 7,152,135 B2 * | 12/2006 | Chou | 710/315 |
| 2005/0038947 A1 * | 2/2005 | Lueck et al. | 710/315 |
| 2005/0283561 A1 * | 12/2005 | Lee et al. | 710/307 |
| 2006/0123178 A1 * | 6/2006 | Lueck et al. | 710/306 |
| 2006/0294272 A1 * | 12/2006 | Chou et al. | 710/62 |
| 2007/0283059 A1 * | 12/2007 | Ho et al. | 710/104 |
| 2007/0288681 A1 * | 12/2007 | Lee et al. | 710/315 |
| 2009/0006707 A1 * | 1/2009 | Hubert et al. | 710/313 |

* cited by examiner

OTHER PUBLICATIONS

Ismail, R. ,"USB 3.0 Presentation slides At INTEL Developer Forum", San Francisco, Sep. 18, 2007.

*Primary Examiner*—Glenn A Auve
(74) *Attorney, Agent, or Firm*—Stuart T. Auvinen; g Patent LLC (57) ABSTRACT

An extended universal-serial bus (EUSB) bridge to a host computer can have peripheral component interconnect express (PCIE) protocol layers on one side of the bridge, and EUSB layers on the other side of the bridge, with a high-level bridging converter module connecting the upper layers. The PCIE physical, data-link, and transport layers may be eliminated by integrating the bridge with an I/O controller. PCIE requests and data payloads are directly sent to the bridge, rather than low-level PCIE physical signals. The PCIE data payloads are converted to EUSB data payloads by a high-level direct bridging converter module. Then the EUSB data payloads are passed down to an EUSB transaction layer, an EUSB data-link layer, and an EUSB physical layer which drives and senses physical electrical signals on both differential pairs of the EUSB bus.

19 Claims, 10 Drawing Sheets

HIGH-LEVEL BRIDGE FROM PCIE TO EXTENDED USB

RELATED APPLICATION

This application is a continuation-in-part (CIP) of the co-pending application for "Backward Compatible Extended-MLC USB Plug And Receptacle with Dual Personality", U.S. application Ser. No. 11/864,696 filed Sep. 28, 2007, which is a CIP of "Extended Secure-Digital (SD) Card Devices and Hosts", U.S. application Ser. No. 10/854,004 filed May 25, 2004. This application is also a CIP of "Serial Interface to Flash Memory Chip using PCI-Express-Like Packets and Packed Data for Partial-Page Writes", U.S. application Ser. No. 10/708,096 filed Feb. 9, 2004, now U.S. Pat. No. 7,130,958 and is a CIP of the U.S. Patent application for "Expresscard with On-Card Flash Memory with Shared Flash Control Bus but Separate Ready Lines", U.S. Ser. No. 10/707,138, filed Nov. 22, 2003 now abandoned.

This application is also a continuation-in-part (CIP) of the co-pending application for "Electronic Data Storage Medium with Fingerprint Verification Capability", U.S. Ser. No. 11/624,667 filed Jan. 18, 2007.

FIELD OF THE INVENTION

This invention relates to extended universal-serial bus (USB) systems, and more particularly to lower-power USB protocol extensions that reduce power.

BACKGROUND OF THE INVENTION

A great variety of small portable devices such as personal digital assistants (PDA), multi-function cell phones, digital cameras, music players, etc. have become widely available. These devices use a central processing unit (CPU) or microcontroller and a mass-storage memory such as a hard drive or flash memory. These small devices are often cost and size sensitive.

Hard disks and other mass storage devices are being replaced or supplemented with solid-state mass storage such as flash memories. Flash memories use non-volatile memory cells such as electrically-erasable programmable read-only memory, (EEPROM), but are not randomly accessible at the byte level. Instead, whole pages or sectors of 512 bytes or more are read or written together as a single page. NAND flash memory is commonly used for data storage of blocks. Pages in the same block may have to be erased together, and limitations on writing may exist, such as only being allowed to write each page once between erases.

These small portable electronic devices often are able to connect to a host computer such as a personal computer (PC). While a proprietary connector may be used, a connector for a standard expansion bus is preferable. Universal-serial bus (USB) is often used to connect such portable flash-memory devices to a PC.

USB uses one pair of differential lines that are time-duplexed, or used for transmission in both directions, but at different times. This may limit performance when data needs to be sent in both directions at the same time. The current USB 2.0 standard provides that the host, such as the PC, controls the bus as the bus master, while USB devices plugged into the host act as slave devices. A USB controller on the host PC generates data transfer transactions and waits for USB devices to respond, either by transmitting requested data to the host, or by writing host data into the USB device's memory.

Often a host system contains several different buses. For example, the host may have a peripheral component interconnect express (PCIE) bus, a universal-serial bus (USB), an Integrated Device Electronics (IDE) bus, and an AT bus.

Some buses may be enhanced with a revised version of the protocol specification. For example, USB has a version 2.0 and a newer proposed version 3.0 that improves performance by using a full-duplex differential bus, and by eliminating polling.

Devices to convert one bus type to another bus type are known as bridges. Bridges are needed for the new revisions to bus protocol standards. In particular, a bridge to the new USB 3.0, or extended USB (EUSB) is desired.

Legacy host systems are not equipped for the newer bus protocols since these legacy systems are older and were designed before the new bus protocols were available. Nevertheless, it is desirable to retrofit these legacy systems for use with the new bus protocols. A bridge from an existing bus on the legacy system to the new bus may be added. However, adding another bridge device may increase delays to the new bus, defeating some of the performance advantage of the new bus protocol.

Bridges are often slow since all protocol layers may be present and are traversed. Data packets must flow up through the stack of protocol layers and then back down another stack of protocol layers for the other bus. When multiple bus standards are present on a host system, several bridges may be used in series, causing increased delays for multiple successive format conversions by multiple bridge devices.

What is desired is a bridge to an EUSB device. A bridge that is more efficient is desirable. A bridge that directly converts to EUSB is desired. A bridge for a legacy system that converts from an existing standard to EUSB is also desired.

DETAILED DESCRIPTION

The present invention relates to an improvement in universal-serial bus (USB) bridges. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
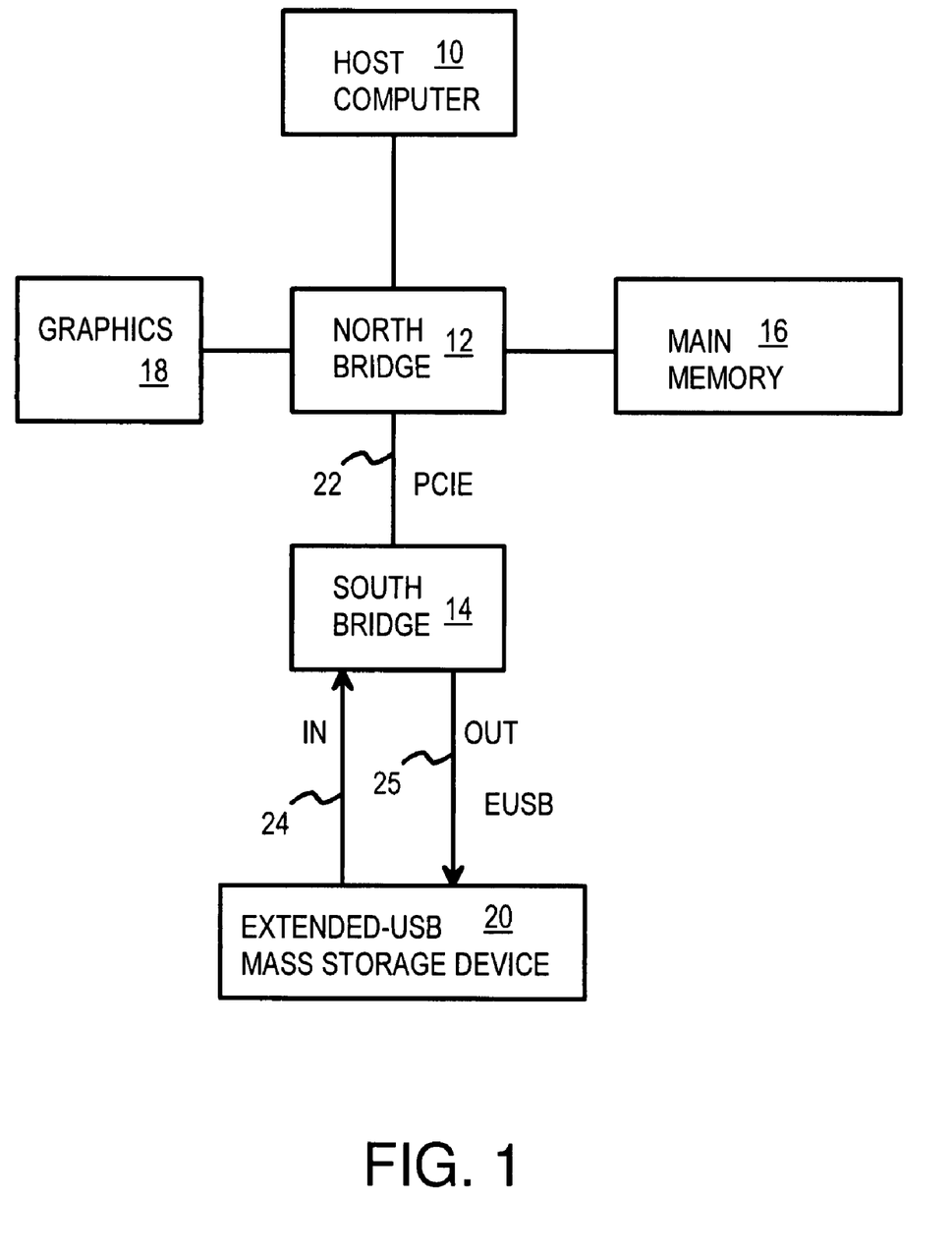
FIG. 1 is a block diagram of a simplified host and device connected with an extended universal-serial bus (EUSB).

FIG. 1 is a block diagram of a simplified host and device connected with an extended universal-serial bus (EUSB). Host computer 10 executes instructions including those in user and application programs, operating systems, device drivers, and other applets. Main memory 16 may be a dynamic random-access memory (DRAM) or other kind of RAM that stores instructions and data that is accessed by the central processing unit (CPU) in host computer 10.

North bridge 12 contains bus and memory controllers that generate control signals of the proper timing to main memory 16 and to graphics system 18. North bridge 12 also contains a peripheral component interconnect express (PCIE) controller that generates transactions on PCIE bus 22.

PCIE bus 22 connects north bridge 12 to south bridge 14. South bridge 14 also contains bus controllers and bus logic. An extended universal-serial bus (EUSB) controller in south bridge 14 converts PCIE transactions into EUSB transactions that are sent to EUSB device 20 over the EUSB bus. However, rather than time-duplex a single differential pair of lines, two differential pairs are provided, allowing full-duplex data transfers. OUT differential pair 25 can be sending data from the host to EUSB device 20 at the same time that IN differential pair 24 is sending data read from EUSB device 20 back to host computer 10. Thus EUSB device 20 provides a higher performance than an ordinary USB 2.0 device that is only half-duplex.

Figure 2:
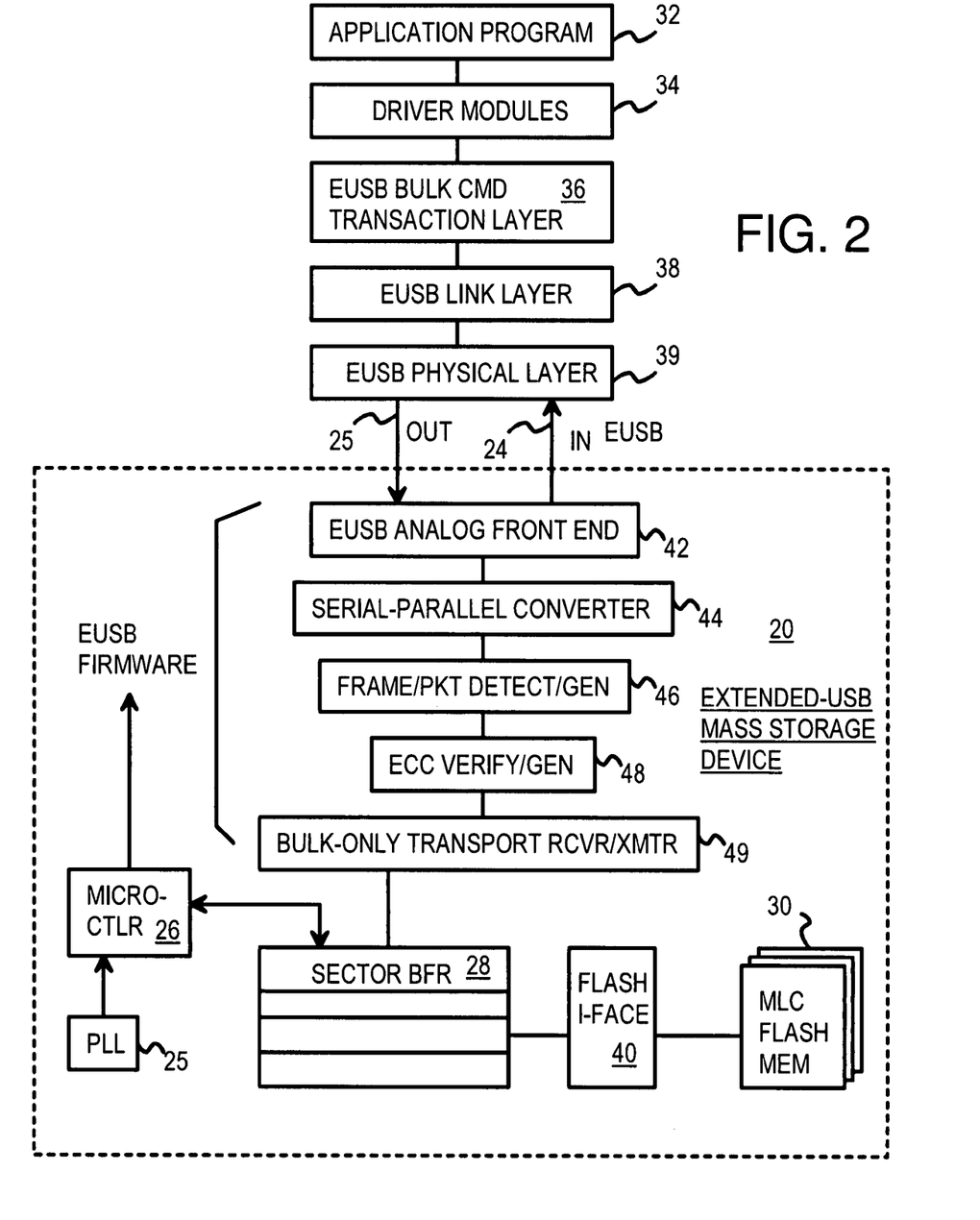
FIG. 2 shows an EUSB device connected to a EUSB host.

FIG. 2 shows an extended USB device connected to a EUSB host. Application program 32 on a host needs to read data that is stored in flash memory 30 on EUSB device 20. Application program 32 sends a data-read request to a device driver for the flash in device modules 34, which activate EUSB bulk-only-transfer and command transaction layer 36. EUSB bulk-only-transport and command transaction layer 36 embed a read command inside a EUSB data payload and header using the bulk-only-transport mode of USB. A cyclical-redundancy-check (CRC) checksum is also attached.

EUSB link layer 38 adds a sequence number and another CRC checksum, while EUSB physical layer 39 adds packet framing and performs 8/10-bit encoding. The framed data packet is sent from the host to EUSB device 20 over OUT differential pair 25.

EUSB analog front end 42 senses the data transitions on OUT differential pair 25, extracts the clock, and sends serial data to serial-parallel converter 44, which generates parallel data words. The parallel data words are examined by frame and packet detector 46 to locate frame and packet boundaries. The header and data payload can be located by bulk-only-transport receiver 49, ECC generator/checker 48 checks CRC's for error detection. The data payloads can be written into sector buffer 28.

Microcontroller 26 examines the headers and data payloads from bulk-only-transport receiver 49 and detects the read command. Microcontroller 26 activates flash interface 40 to perform a read of flash memory 30, and the flash data read is transferred into sector buffer 28. This flash data in sector buffer 28 is formed into data payloads, a header attached by bulk-only-transport receiver 49, and passed back down the layers for transmission to the host over IN differential pair 24.

Phase-locked loop (PLL) 25 may be driven by an external crystal (not shown) and generates an internal clock to microcontroller 26 and other components such as sector buffer 28.

Microcontroller 26 controls operation of EUSB firmware that may include bulk-only-transport receiver 49, ECC generator/checker 48, frame and packet detector 46, serial-parallel converter 44, and EUSB analog front end 42.

When the EUSB device is not yet ready to send data to the host, the EUSB device asserts a not yet (NYET) signal to the host. When the EUSB device is ready again to send data, it asserts a ready (RDY) signal to the host, and de-asserts the NYET signal.

The addition of the NYET and RDY signals allows the host to simply monitor these signals to detect when the EUSB device is ready to continue sending data. With the NYET signal, the host no longer has to continuously poll the USB device to determine when the data is ready for transmission.

The host is still the bus master and initiates a transfer by sending a packet with the IN request to the EUSB device. The request also contains a number that indicates a number of buffers available in the host, or the number of packets that can be accepted by the host. Other information such as a device identifier or address of the EUSB device can be included in the IN request packet.

Figure 3A:
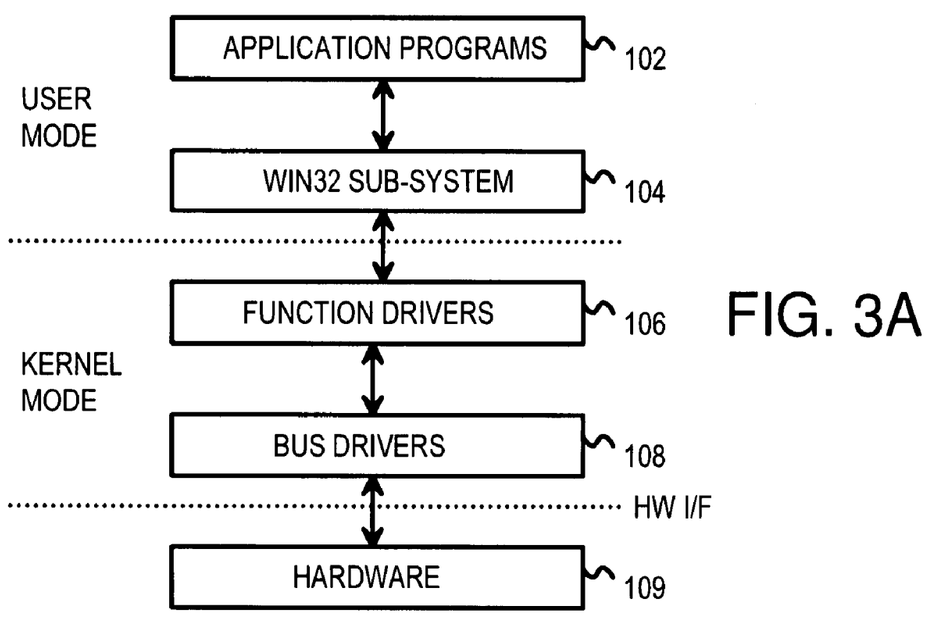
FIGS. 3A-B are diagrams of an EUSB bus directly connecting to a host system.
Figure 3B:
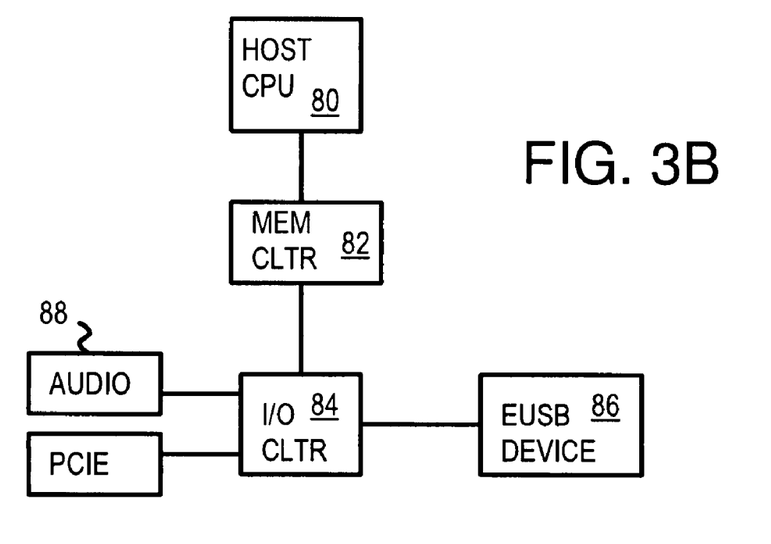
Figure 4:
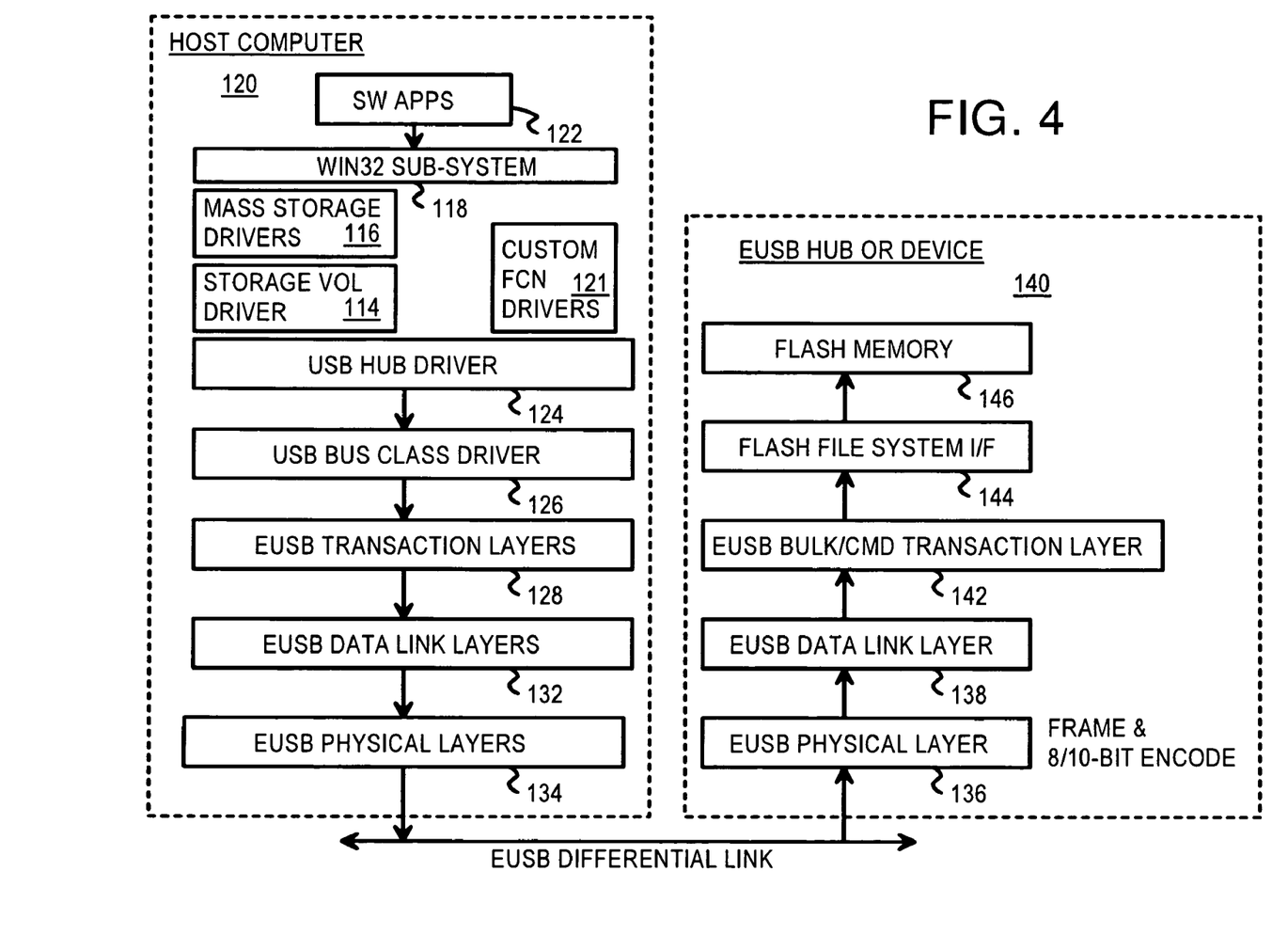
FIG. 4 is a diagram of a host that connects directly to a EUSB device over a EUSB bus.

Replacing USB Layers with EUSB Layers—FIGS. 3-4

FIGS. 3A-B are diagrams of an EUSB bus directly connecting to a host system. FIG. 3A is a protocol-layer diagram of a host with modified layers for EUSB. Application programs 102 on a host read data that is stored in hardware 109, such as an EUSB flash memory device. Application programs 102 use high-level application-programming interface (API) calls in WIN32 sub-system 104 to send I/O request packets that activate function drivers 106 for a memory-read function. Function drivers 106 locate the device that stores the requested data and send a data-read request packet to bus driver 108 for a bus transaction that can read the data from the flash memory device on the target bus. Bus drivers 108 then drive the physical signals onto the cable or traces of the target bus over a hardware interface to hardware 109, which can be a EUSB flash-memory device.

Application programs 102 and WIN32 sub-system 104 are in a user mode operating on the host computer, while function drivers 106 and bus drivers 108 are in a kernel mode.

FIG. 3B is a block diagram of a system with an EUSB bus directly connected to the host. Host central processing unit (CPU) 80 executes instructions including those in user and application programs, operating systems, device drivers, and other applets. A main memory such as a DRAM (not shown) may be accessed by memory controller 82.

Memory controller 82 connects to I/O controller 84 so that slower peripheral buses do not load down faster local buses such as to DRAM or graphics controllers. I/O controller 84 contains a bus controller that generates control signals of the proper timing to peripheral devices 88, such as an audio device or a peripheral component interconnect express (PCIE) device on a PCIE bus.

EUSB device 86 connects to I/O controller 84 through an EUSB bus. An extended universal-serial bus (EUSB) controller in I/O controller 84 converts host transactions into EUSB transactions that are sent to EUSB device 86 over the EUSB bus.

However, rather than time-duplex a single differential pair of lines, two differential pairs are provided, allowing full-duplex data transfers. The OUT differential pair can be sending data from the host to EUSB device 86 at the same time that the IN differential pair is sending data read from EUSB device 86 back to the host computer. Thus EUSB device 86 provides a higher performance than an ordinary USB 2.0 device that is only half-duplex.

FIG. 4 is a diagram of a host that connects directly to a EUSB device over a EUSB bus. Newer host computers may be equipped with an I/O controller that directly converts host requests to EUSB. However, older legacy systems do not have this ability.

Host computer 120 connects to EUSB device 140 over an EUSB bus that has two differential pairs of lines for full-duplex transfers. Software application programs 122 on host 120 read data that is stored in flash memory 146 on EUSB device 140.

Software application programs 122 use high-level application-programming interface (API) calls in WIN32 sub-system 118 to send I/O request packets that activate function drivers for a memory-read function. Drivers include mass-storage drivers 116 that locate the requested data to a particular class or type of mass-storage device, storage-volume drivers 114 that activate a particular mass-storage device containing a storage volume, and custom function drivers 121 which define a user interface for custom hardware.

USB hub driver 124 initializes all USB ports that are attached to the host, which acts as a root hub. USB bus class driver 126 manages USB transactions, and controls power-down of USB links.

The lower USB layers are replaced with EUSB layer drivers, for the transaction, data-link, and physical layers.

EUSB transaction layers 128 include EUSB bulk-only-transfer and command transaction layers. The EUSB bulk-only-transport and command transaction layers embed a read command inside a EUSB data payload and header using the bulk-only-transport mode of EUSB. A cyclical-redundancy-check (CRC) checksum is also attached by EUSB transaction layers 128.

EUSB data link layers 132 adds a sequence number and another CRC checksum, while EUSB physical layers 134 add packet framing and performs 8/10-bit encoding. The framed data packet is sent from host 120 to EUSB device 140 over the OUT differential pair in the EUSB bus.

On EUSB device 140, EUSB physical layer 136 includes an analog front end that senses the data transitions on the OUT differential pair, extracts the clock, and converts serial data to parallel. Frame and packet boundaries are located and 8/10-bit decoding is performed.

EUSB data link layers 138 reads sequence numbers from packets received and puts these packets in sequential order. A cyclical-redundancy-check (CRC) checksum is also generated and compared to detect errors at the link level.

EUSB transaction layers 142 processes EUSB commands and also bulk-only-transport of data. An ECC generator/checker checks CRC's for error detection at the transport level. The headers can be extracted and the data payloads can be written into a sector buffer. A microcontroller examines the headers and data payloads and detects a read command. A flash interface is activated by flash file system 144 to perform a read of flash memory 146, and the flash data read is transferred into a sector buffer. This flash data in the sector buffer is formed into data payloads, a header attached by EUSB transaction layers 142, and passed back down the layers for transmission to host 120 over the IN differential pair.

While replacing USB transaction, data-link, and physical layers as shown in FIGS. 3-4 is effective for newly-designed host computers, older legacy computers cannot be upgraded from USB to EUSB since EUSB has two differential pairs, while USB has only one differential pair.

Figure 5A:
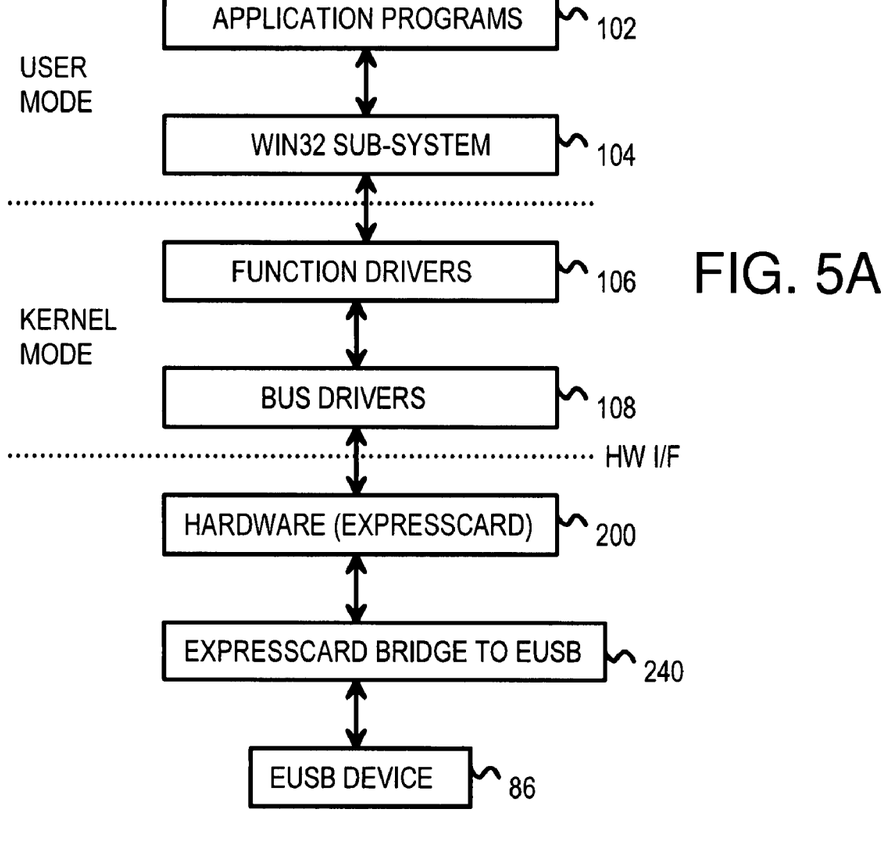
FIGS. 5A-B are diagrams of an EUSB bus connecting to a host system through a PCIE-to-EUSB bridge.
Figure 5B:
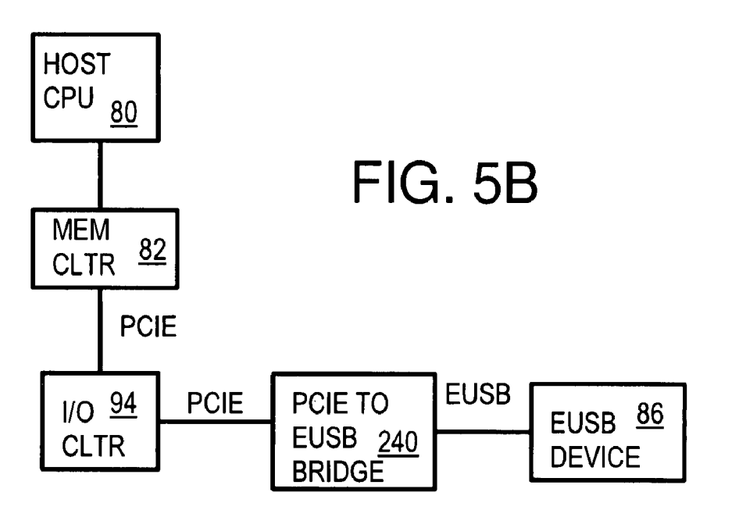
Figure 6:
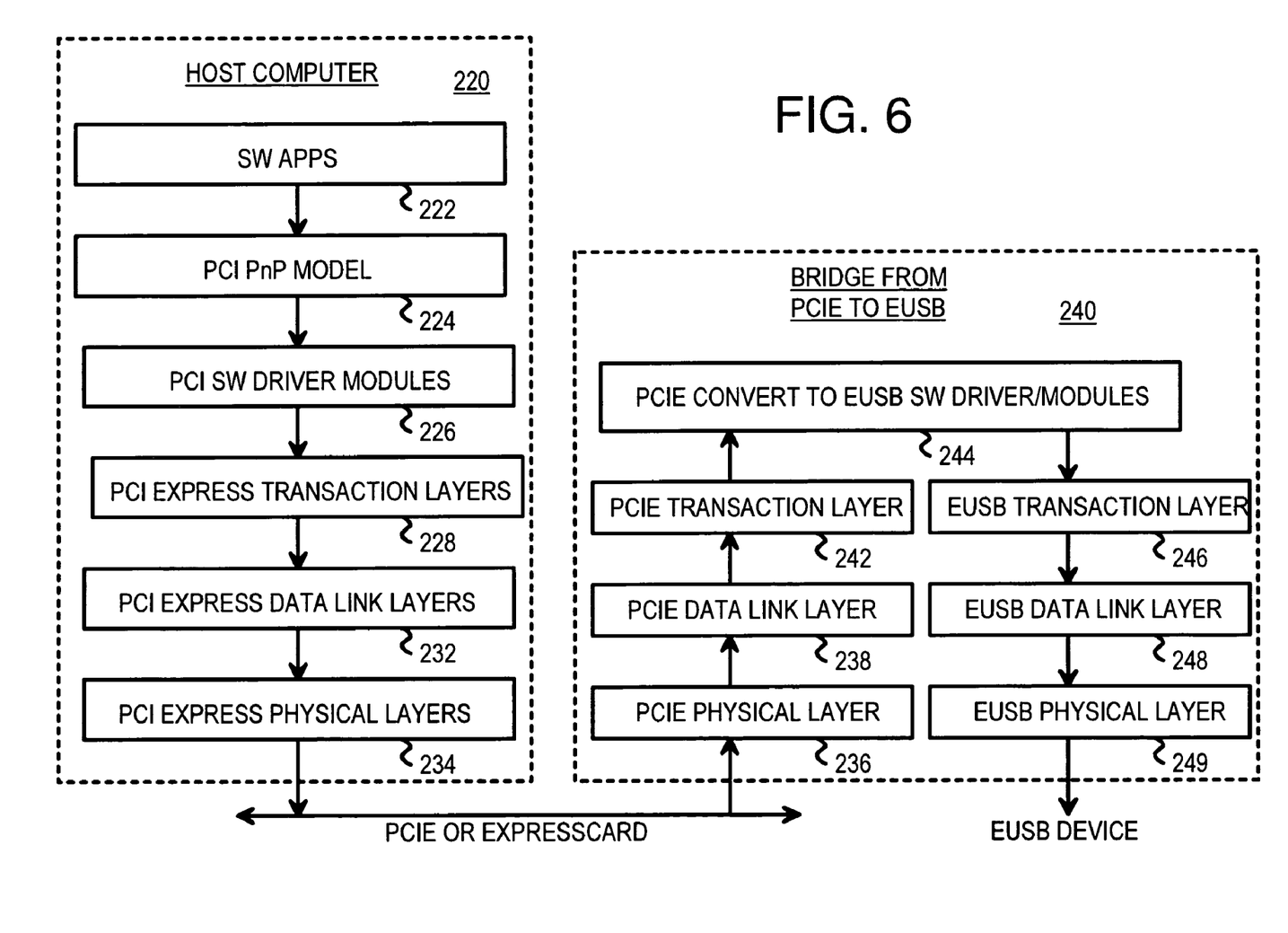
FIG. 6 is a diagram of a host that connects to an EUSB device through a PCIE-to-EUSB bridge.

PCIE-to-EUSB Bridge—FIGS. 5-6

FIGS. 5A-B are diagrams of an EUSB bus connecting to a host system through a PCIE-to-EUSB bridge. FIG. 5A is a protocol-layer diagram of a PCIE host connected to a PCIE-to-EUSB bridge. Application programs 102 on a host read data that is stored in hardware 200, such as an EXPRESSCARD personal computer card or other PCIE device.

The PCIE bus from the host then connects to PCIE-to-EUSB bridge 240. EXPRESSCARD personal computer card is a subset of PCIE with a pre-determined form factor. PCIE-to-EUSB bridge 240 then connects to EUSB device 86.

Application programs 102 use high-level application-programming interface (API) calls in WIN32 sub-system 104 to send I/O request packets that activate function drivers 106 for a memory-read function. Function drivers 106 locate the device that stores the requested data and send a data-read request packet to bus driver 108 for a PCIE bus transaction. Bus drivers 108 then drive the physical signals onto the cable or traces of the PCIE bus over a hardware interface to hardware 200, which can include EXPRESSCARD personal computer card or other PCIE devices.

One PCIE device plugged into the PCIE bus is PCIE-to-EUSB bridge 240. PCIE-to-EUSB bridge 240 receives PCIE packets and converts them into EUSB packets that are sent over an EUSB bus to EUSB device 86.

FIG. 5B is a block diagram of a system with an EUSB device connected to the host through a PCIE-to-EUSB bridge. Host central processing unit (CPU) 80 executes instructions including those in user and application programs, operating systems, device drivers, and other applets. A main memory such as a DRAM (not shown) may be accessed by memory controller 82.

Memory controller 82 connects to I/O controller 94 over a PCIE bus so that slower peripheral buses do not load down faster local buses such as to DRAM or graphics controllers. I/O controller 94 contains a bus controller that generates PCIE control signals of the proper timing to other peripheral devices, such as an audio device.

PCIE-to-EUSB bridge 240 connects to I/O controller 94 through a PCIE bus, but connects to EUSB device 86 over an EUSB bus. Latency from host 80 to EUSB device 86 is increased due to insertion of PCIE-to-EUSB bridge 240 relative to the system shown in FIGS. 3-4, but PCIE-to-EUSB bridge 240 can be added to a legacy host.

FIG. 6 is a diagram of a host that connects to an EUSB device through a PCIE-to-EUSB bridge. Older legacy host computers cannot easily be equipped with a new I/O controller that directly converts host requests to EUSB. Thus adding PCIE-to-EUSB bridge 240 is better suited to older legacy systems.

Host computer 220 connects to an EUSB device (not shown) through PCIE-to-EUSB bridge 240. PCIE-to-EUSB bridge 240 connects to an EUSB device over an EUSB bus that has two differential pairs of lines for full-duplex transfers. Software application programs 222 on host 220 read data that is stored in flash memory on the EUSB device by first converting a PCIE transaction into a EUSB transaction using PCIE-to-EUSB bridge 240.

Software application programs 222 use high-level application-programming interface (API) calls to send I/O request packets over the PCIE bus. These I/O request packets are converted to EUSB packets by PCIE-to-EUSB bridge 240 and passed on to the EUSB device for reading the flash memory.

PCI plug-n-play model 224 initializes, enumerates, and configures all PCIE devices and ports that are attached to the host. PCI software driver modules 226 manage PCI bus transactions generated in response to higher-level requests from software application programs 222.

PCIE transaction layers 228 generate a PCI header that is attached to the data payload from the higher layers. PCIE commands may also be included in the PCIE packet. PCIE transaction layers 228 embed a read command inside a PCIE data payload and header. A checksum may also be attached by PCIE transaction layers 228.

PCIE data link layers 232 add packet sequencing and error detection information, while PCIE physical layers 234 add packet framing and encoding. The framed data packet is sent from host 220 to PCIE-to-EUSB bridge 240 over PCIE bus.

On PCIE-to-EUSB bridge 240, PCIE physical layer 236 includes an analog front end that senses the data transitions on the PCIE bus, extracts the clock, and converts serial data to parallel. Frame and/or packet boundaries are located and decoding is performed.

PCIE data link layers 238 puts the PCIE packets in correct sequence order. Error detection and/or correction may also be performed at the PCIE link level.

PCIE transaction layers 242 processes PCIE commands and extract the PCIE data payload from the PCIE packet. An ECC generator/checker checks CRC's for error detection at the transport level.

High-level bridging converter modules 244 convert the PCIE data payload into a EUSB data payload. Any embedded commands for the flash memory are treated as data by high-level bridging converter modules 244.

The converted EUSB data payload is sent from high-level bridging converter modules 244 to EUSB transaction layers 246, which adds an EUSB header and CRC, and passed back down to EUSB data-link layer 248 which adds sequence numbers and another CRC. Finally EUSB physical layer 249 performs framing, encoding, serializing, and physically drives the differential OUT lines of the EUSB bus that connects to the EUSB device.

While connecting a legacy host through a PCIE-to-EUSB bridge as shown in FIGS. 5-6 is effective for older legacy computers, additional delay and latency is added by the many layers 228, 232, 234 on host 220, and layers 236, 238, 242 on PCIE-to-EUSB bridge 240.

Figure 7A:
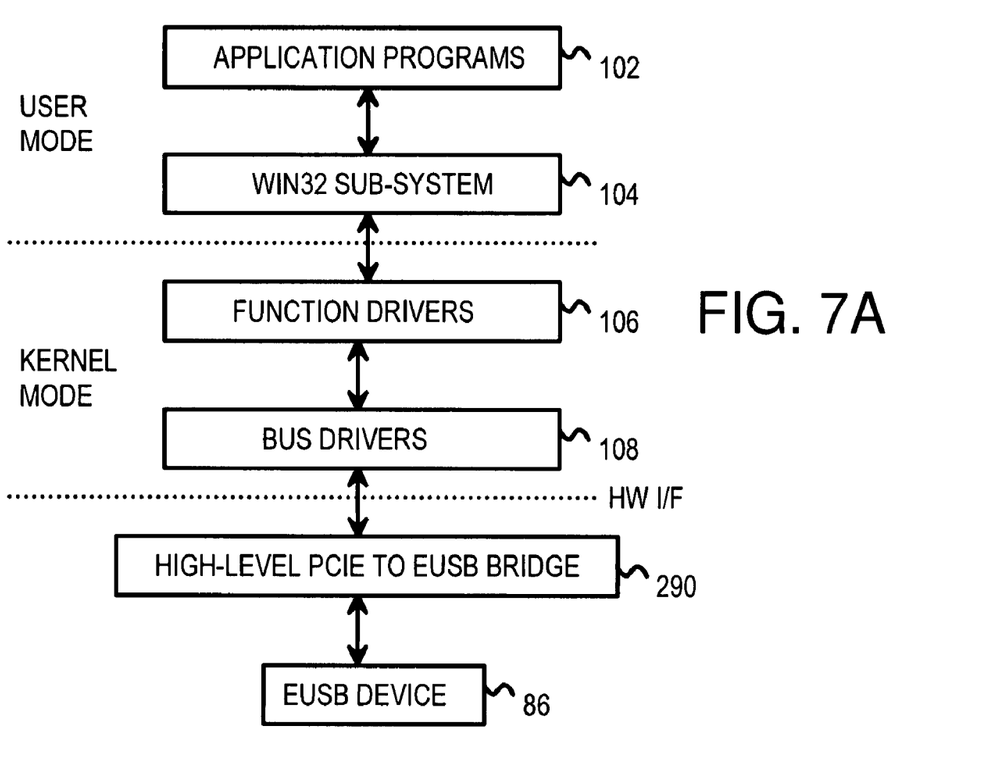
FIGS. 7A-B are diagrams of an EUSB bus connecting to a host system through a high-level integrated PCIE-to-EUSB bridge.
Figure 7B:
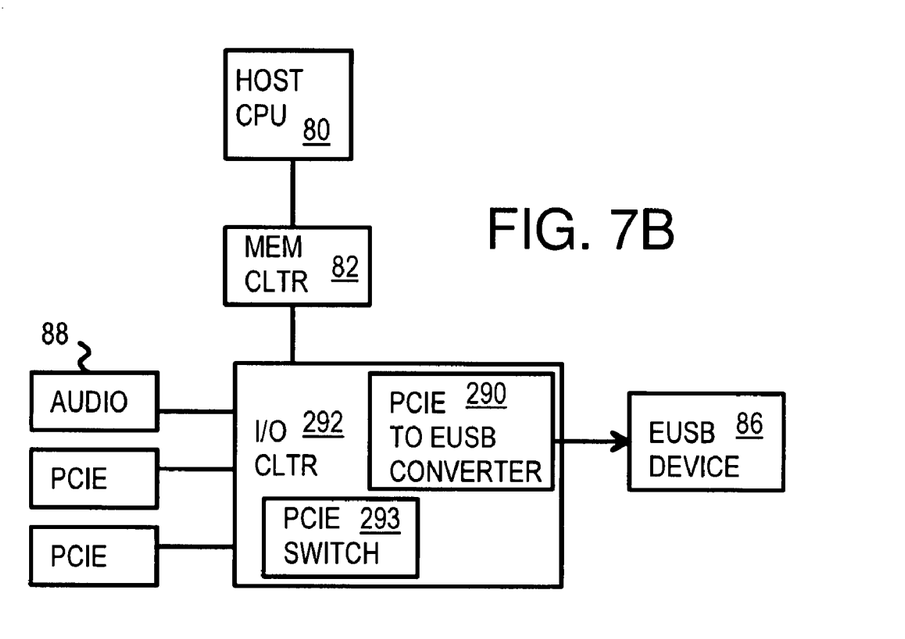
Figure 8:
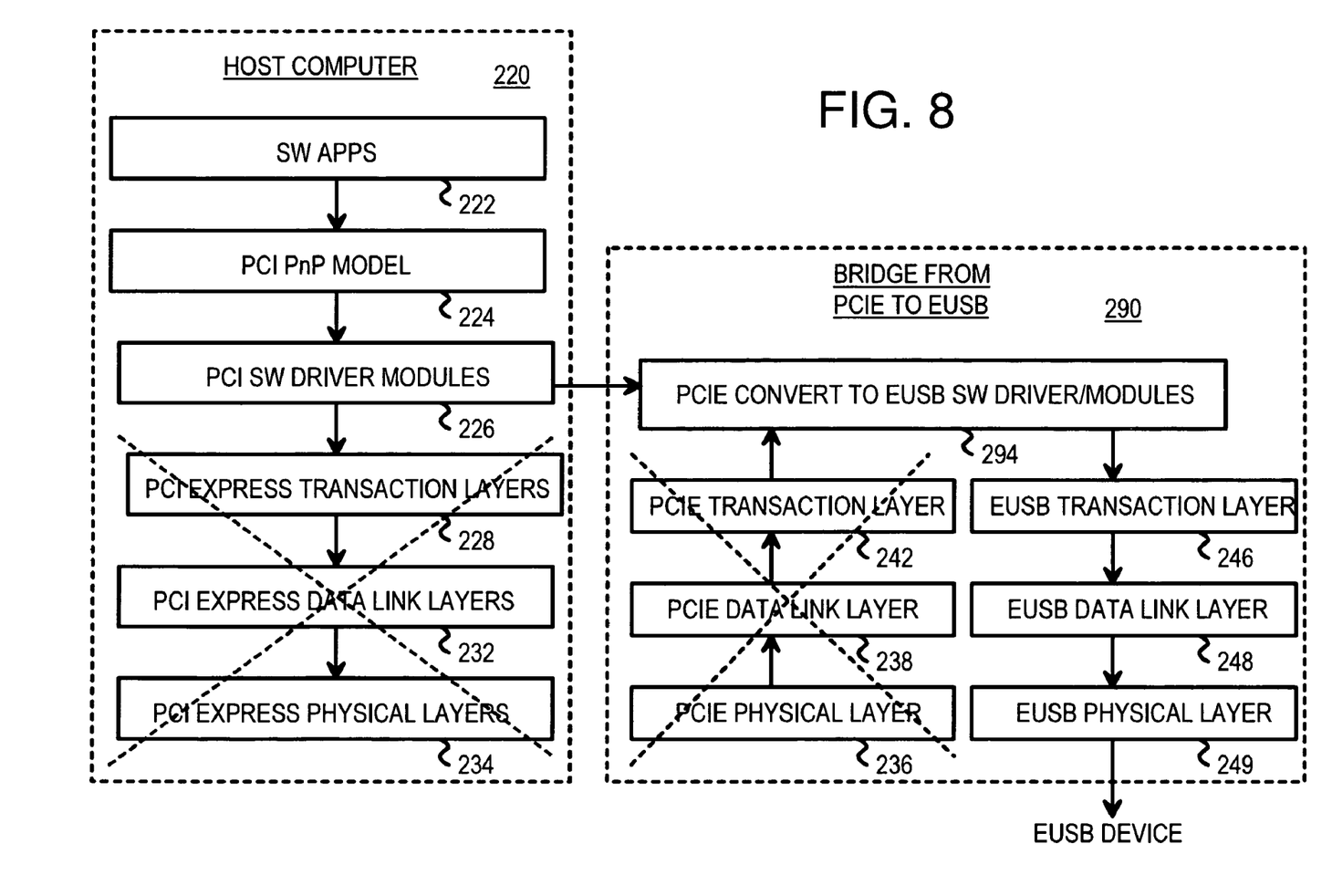
FIG. 8 is a diagram of a host that connects to an EUSB device through a high-level integrated PCIE-to-EUSB bridge.

Integrated Direct PCIE-to-EUSB Bridge—FIGS. 7-8

FIGS. 7A-B are diagrams of an EUSB bus connecting to a host system through a high-level integrated PCIE-to-EUSB bridge. FIG. 7A is a protocol-layer diagram of a PCIE host connected to a high-level integrated PCIE-to-EUSB bridge. Application programs 102 on a host read data that is stored in hardware, such as an EUSB device 86.

The host connects at a high-level of PCIE, rather than at the PCIE physical bus level, to high-level integrated PCIE-to-EUSB bridge 290. High-level integrated PCIE-to-EUSB bridge 290 then connects to EUSB device 86.

Application programs 102 use high-level application-programming interface (API) calls in WIN32 sub-system 104 to send I/O request packets that activate function drivers 106 for a memory-read function. Function drivers 106 locate the device that stores the requested data and send a data-read request packet to bus driver 108 for a PCIE bus transaction.

Bus drivers 108 normally drive the physical signals onto the cable or traces of the PCIE bus over a hardware interface to PCIE hardware, which can include EXPRESSCARD personal computer card or other PCIE devices. However, high-level PCIE requests are instead transferred directly to high-level integrated PCIE-to-EUSB bridge 290. High-level integrated PCIE-to-EUSB bridge 290 receives high-level PCIE requests and converts them into EUSB packets that are sent over an EUSB bus to EUSB device 86.

FIG. 7B is a block diagram of a system with an EUSB device connected to the host through a high-level integrated PCIE-to-EUSB bridge. Host central processing unit (CPU) 80 executes instructions including those in user and application programs, operating systems, device drivers, and other applets. A main memory such as a DRAM (not shown) may be accessed by memory controller 82.

Memory controller 82 connects to I/O controller 292 over a PCIE bus so that slower peripheral buses do not load down faster local buses such as to DRAM or graphics controllers. I/O controller 292 contains a bus controller and PCIE switch 293 that generate PCIE control signals of the proper timing to other peripheral devices 88, such as an audio device and PCIE devices.

I/O controller 292 also contains high-level integrated PCIE-to-EUSB bridge 290 that connects to EUSB device 86 over an EUSB bus. Latency from host 80 to EUSB device 86 is reduced since high-level integrated PCIE-to-EUSB bridge 290 is tightly integrated at a high layer of PCIE.

FIG. 8 is a diagram of a host that connects to an EUSB device through a high-level integrated PCIE-to-EUSB bridge. Host computer 220 connects to an EUSB device (not shown) through high-level integrated PCIE-to-EUSB bridge 290. High-level integrated PCIE-to-EUSB bridge 290 connects to an EUSB device over an EUSB bus that has two differential pairs of lines for full-duplex transfers. Software application programs 222 on host 220 read data that is stored in flash memory on the EUSB device by first converting a PCIE transaction into a EUSB transaction using high-level integrated PCIE-to-EUSB bridge 290.

Software application programs 222 use high-level application-programming interface (API) calls to send I/O requests. These I/O requests are converted at a high layer of PCIE to EUSB packets by high-level integrated PCIE-to-EUSB bridge 290 and passed on to the EUSB device for reading the flash memory. The I/O request are not first converted to physical PCIE signals, skipping PCIE transaction layers 228, PCIE data link layers 232, and PCIE physical layers 234 on host 220. Skipping PCIE transaction layers 228, PCIE data link layers 232, and PCIE physical layers 234 on host 220 reduces delays.

PCI plug-n-play model 224 initializes, enumerates, and configures all PCIE devices and ports that are attached to the host, including a direct high-level PCIE connection to high-level integrated PCIE-to-EUSB bridge 290. PCI software driver modules 226 manage PCI bus transactions generated in response to higher-level requests from software application programs 222, including a direct high-level PCIE connection to high-level integrated PCIE-to-EUSB bridge 290.

High-level PCIE requests are sent directly from PCI software driver modules 226 to high-level direct bridging converter modules 294 in high-level integrated PCIE-to-EUSB bridge 290.

High-level direct bridging converter modules 294 convert the PCIE data payload in the PCIE request from PCI software driver modules 226 into a EUSB data payload. Any embedded commands for the flash memory are treated as data by high-level direct bridging converter modules 294.

The converted EUSB data payload is sent from high-level direct bridging converter modules 294 to EUSB transaction layers 246, which adds an EUSB header and CRC, and passed back down to EUSB data-link layer 248 which adds sequence numbers and another CRC. Finally EUSB physical layer 249 performs framing, encoding, serializing, and physically drives the differential OUT lines of the EUSB bus that connects to the EUSB device.

While connecting a legacy host through a PCIE-to-EUSB bridge as shown in FIGS. 5-6 is effective for older legacy computers, additional delay and latency is added by the many layers 228, 232, 234 on host 220, and layers 236, 238, 242 on high-level integrated PCIE-to-EUSB bridge 290. These additional delays are eliminated in the embodiment of FIGS. 7-8 by using high-level direct bridging converter modules 294, which directly receives PCIE data payloads and requests from PCI software driver modules 226.

Skipping PCIE transaction layers 228, PCIE data link layers 232, and PCIE physical layers 234 on host 220 reduces delays. Also, skipping PCIE physical layer 236, PCIE data link layers 238, and PCIE transaction layers 242 on high-level integrated PCIE-to-EUSB bridge 290 further reduces delays.

Figure 9:
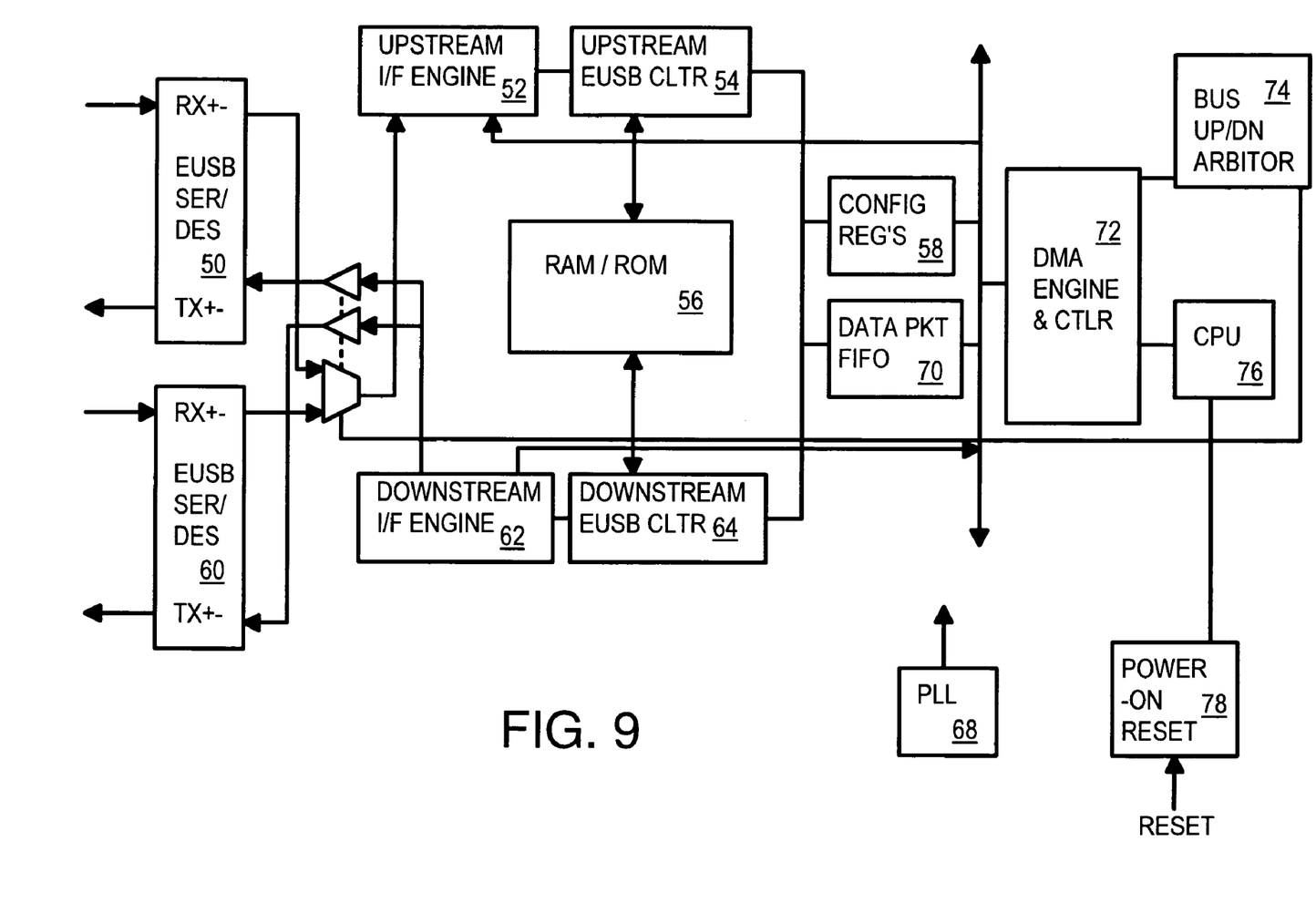
FIG. 9 is a block diagram of a EUSB hub.

FIG. 9 is a block diagram of a EUSB hub. Rather than a bridge such as PCIE-to-EUSB bridge 240, a hub device may be used to connect two segments of a EUSB bus. Both sides have the same protocol in a hub.

A first EUSB link with both a receive and a transmit differential pair connects to serializer/deserializer 50, while another link with another two differential pairs connects to serializer/deserializer 60. Incoming parallel data from either link is muxed into upstream interface engine 52, which performs EUSB protocol processing. Upstream EUSB controller 54 controls upstream interface engine 52 and other components to process the incoming parallel words, using instructions in RAM/ROM 56. The processed incoming data is loaded into data packet FIFO 70 and moved by DMA engine 72 under the control of local CPU 76.

When the data is not for the local hub, the data in data packet FIFO 70 is sent back down to downstream interface engine 62. Downstream EUSB controller 64 controls downstream interface engine 62 and other components to process the outgoing parallel words, using instructions in RAM/ROM 56. The processed outgoing data is buffered and sent to either serializer/deserializer 50 or serializer/deserializer 60, to continue the packet's journey either upstream or downstream.

Bus arbiter 74 arbitrates between packets from serializer/deserializer 50 and 50 and 60. It is possible that packets arrive from both upstream and downstream links at the same time. Bus arbiter 74 arbitrates among the simultaneous requests. Power-on reset circuit 78 resets the hub, while phase-locked loop (PLL) 68 generates an internal clock.

Figure 10:
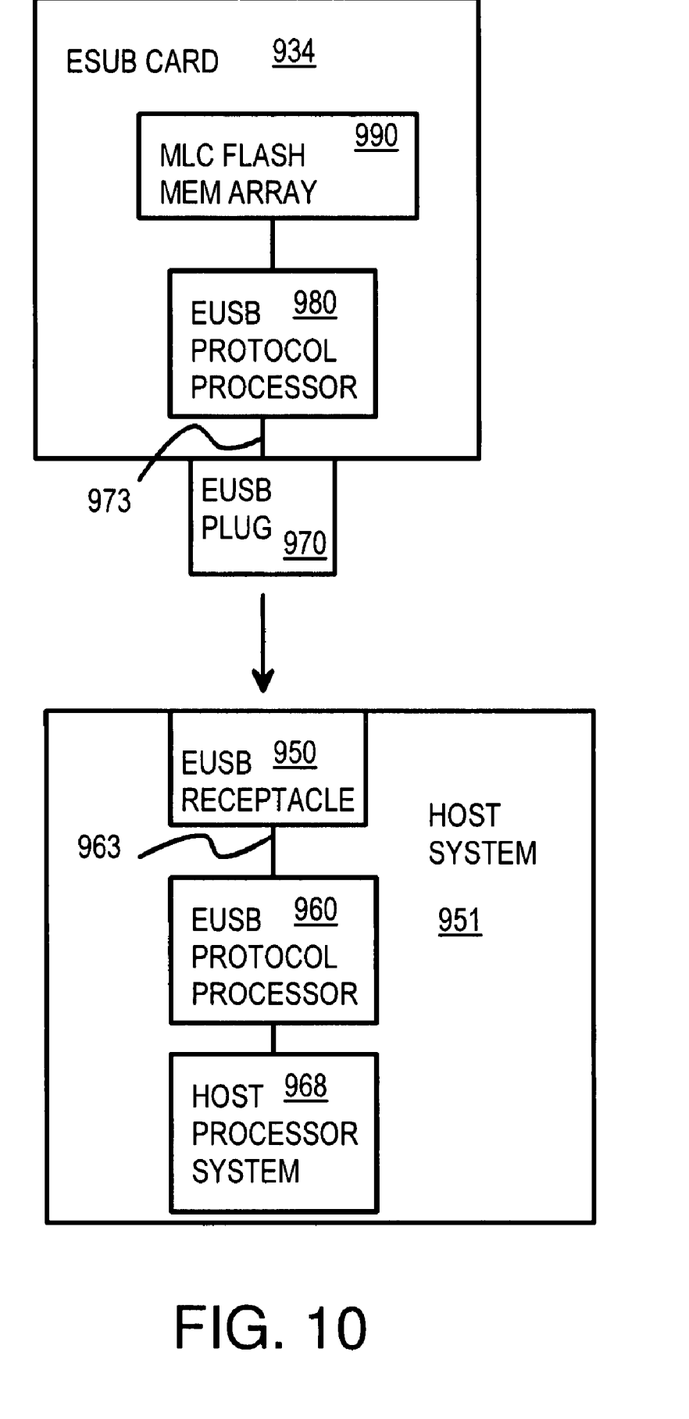
FIG. 10 is a block diagram of host with a EUSB receptacle that supports single-mode EUSB communication.

FIG. 10 is a block diagram of host with a EUSB receptacle that supports single-mode EUSB communication. EUSB card 934 could be plugged into EUSB receptacle 950 of host 951. Host 951 could be a cell phone or a digital camera, etc. EUSB receptacle 950 supports single-mode EUSB communication.

Host 951 has a processor system 968 for executing programs including EUSB management and no-polling programs. Single-personality bus interface 953 communicates processed data from processor system 968 using EUSB protocols.

EUSB card 934 is a EUSB device with a plug that supports EUSB communication. EUSB card 934 has processor system 980 for executing programs including device initializations and bus-response programs. Single-personality bus interface 973 communicates processed data from processor system 980 using the EUSB protocol to its plug 970. MLC flash memory 990 is a flash memory.

Alternate Embodiments

Several other embodiments are contemplated by the inventors. Universal-serial bus (USB) can be extended to eliminate polling by using the NYET and other signals described herein. USB 2.0 may be modified, or other versions of USB may be modified.

The host may enter a suspend or sleep mode when the NYET signal is received. This sleep mode of the host may be with respect to the target EUSB device, rather than to all USB devices. For example, the host may have several channels, each performing a transaction with a different EUSB device. Only channels to busy EUSB device are suspends; other channels from the host may continue operation. Since transfers that are suspended may be re-started by the host, the state of the current transfer does not have to be saved when the host goes into suspend mode. Not having to save state variables can reduce the complexity of the host's suspend mode Instead of USB or other differential buses mentioned above, SD, MicroSD, MMC, or microMMC interfaces can also be applied in this invention. Rather than use SD buses, other buses may be used such as Memory Stick (MS), Compact Flash (CF), IDE bus, etc. Additional pins can be added or substituted for the SD data pins. A multi-bus-protocol chip could have an additional personality pin to select which bus interface to use, or could have programmable registers. Rather than have a SD microcontroller, a Memory Stick microcontroller could be substituted, for use with a memory-stick interface, etc.

While a sector size of 512 bytes has been described, the page size may have another size, such as 1K, 2K, 4K, 8K, etc. Flash blocks may have 4 pages, 8 pages, 64 pages, or some other number, depending on the physical flash chips and arrangement used.

While the invention has been described using an USB controller, a SD or MMC controller may be substituted. A combined controller that can function for both MMC and SD may also be substituted.

Mode logic could sense the state of a pin only at power-on rather than sense the state of a dedicated pin. A certain combination or sequence of states of pins could be used to initiate a mode change, or an internal register such as a configuration register could set the mode.

The microcontroller and USB components such as the protocol layers, bus interface, DMA, flash-memory controller, transaction manager, and other controllers and functions can be implemented in a variety of ways. Functions can be programmed and executed by the CPU or other processor, or can be implemented in dedicated hardware, firmware, or in some combination. Many partitioning of the functions can be substituted.

Data and commands may be routed in a variety of ways, such as through data-port registers, FIFO or other buffers, the CPU's registers and buffers, DMA registers and buffers, and flash registers and buffers. Some buffers may be bypassed or eliminated while others are used or present. Virtual or logical buffers rather than physical ones may also be used. Data may be formatted in a wide variety of ways.

The host can transfer standard USB commands and data transactions to the USB transceiver during a transaction, or may switch to EUSB mode to save power. Other transaction types or variations of these types can be defined for special purposes. These transactions may include a flash-controller-request, a flash-controller-reply, a boot-loader-request, a boot-loader-reply, a control-program-request, a control-program-reply, a flash-memory-request, and a flash-memory-reply. The flash-memory request/reply may further include the following request/reply pairs: flash ID, read, write, erase, copy-back, reset, page-write, cache-write and read-status.

The host may be a personal computer (PC), a portable computing device, a digital camera, a phone, a personal digital assistant (PDA), or other electronic device. The partition of SRAM among various functions could change over time. Wider or narrower data buses and flash-memory blocks could be substituted, such as 4, 5, 8, 16, 32, 64, 128, 256-bit, or some other width data channels. Alternate bus architectures with nested or segmented buses could be used internal or external to the microcontroller. Two or more internal and flash buses can be used in the USB flash microcontroller to increase throughput. More complex switch fabrics can be substituted for the internal buses.

The flash mass storage chips or blocks can be constructed from any flash technology including multi-level-logic (MLC) memory cells. Data striping could be used with the flash mass storage blocks in a variety of ways, as can parity and error-correction code (ECC). Data re-ordering can be adjusted depending on the data arrangement used to prevent re-ordering for overlapping memory locations. An hub or switch could be integrated with other components or could be a stand-alone chip. The hub/switch could also be integrated with the USB single-chip flash device. While a single-chip device has been described, separate packaged chips or die may be stacked together while sharing I/O pins, or modules may be used.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another a tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A peripheral component interconnect express (PCIE) to extended universal-serial bus (EUSB) bridge comprising:
   a PCIE physical layer having an input connection to a first pair of differential lines and having an output connection to a second pair of differential lines;
   a PCIE data link layer, coupled to the PCIE physical layer, for sequencing PCIE packets and for detecting link errors;
   a PCIE transaction layer, coupled to the PCIE data link layer, for inserting a header for a PCIE protocol into outbound PCIE packets, and for extracting the header from inbound PCIE packets;
   an EUSB transaction layer for inserting a header for a EUSB protocol into output parallel words, and for extracting the header from input parallel words;
   an EUSB data-link layer, coupled to the EUSB transaction layer, for adding sequence numbers and checksums to packets of the output parallel words, and for verifying checksums and using the sequence numbers to order the input parallel words;
   an EUSB bus interface, having an input connection to a first pair of differential lines and having an output connection to a second pair of differential lines;
   an EUSB physical layer, coupled to the EUSB data-link layer and to the EUSB bus interface, for converting incoming serial data from the EUSB bus interface to the input parallel words and for converting the output parallel words into outgoing serial data for transmission over the EUSB bus interface; and
   a high-level bridging converter module, coupled to the PCIE transaction layer and to the EUSB transaction layer, for converting PCIE packets into parallel words forming EUSB packets,
whereby PCIE is bridged to EUSB.

2. The PCIE-to-EUSB bridge of claim 1 wherein the EUSB physical layer further comprises:
   a EUSB analog front end having an input connection to the first pair of differential lines and having an output connection to the second pair of differential lines;
   a serial-parallel converter, coupled to the EUSB analog front end to receive an input serial bitstream received over the first pair of differential lines, and coupled to output an output serial bitstream for transmission over the second pair of differential lines, for converting the input serial bitstream into input parallel words, and for converting output parallel words into the output serial bitstream; and
   a frame processor for adding frame bits to the output parallel words, and for removing frame bits from the input parallel words.

3. The PCIE-to-EUSB bridge of claim 2 wherein the EUSB physical layer further comprises:
   an encoder for encoding the output serial bitstream with an 8/10 encoding; and
   a decoder for decoding the input serial bitstream using the 8/10 encoding.

4. The PCIE-to-EUSB bridge of claim 3 wherein the EUSB data-link layer further comprises:
   an error-code generator/checker for generating a generated checksum for the input parallel words and for signaling an error when the generated checksum mismatches a transmitted checksum in the input parallel words, and for generating a checksum stored with the output parallel words.

5. The PCIE-to-EUSB bridge of claim 4 wherein the EUSB transaction layer further comprises:
   a bulk-only-transport layer processor for inserting a header for a EUSB protocol into the output parallel words, and for extracting the header from the input parallel words.

6. A high-level integrated peripheral component interconnect express to extended universal-serial bus (PCIE-to-EUSB) bridge comprising:
   a PCI software driver module, activated by software running on a host, for generating PCI requests with PCI data payloads;

a high-level direct bridging converter module, coupled to receive the PCI requests and the PCI data payloads directly from the PCI software driver module, for converting the PCI data payloads into EUSB data payloads;

a EUSB transaction layer, coupled to the high-level direct bridging converter module, for generating header and checksums to attach to the EUSB data payloads to form EUSB packets;

a EUSB data-link layer, coupled to the EUSB transaction layer, for adding sequence numbers to the EUSB packets, and for placing received EUSB packets in sequence order using the sequence numbers;

a EUSB physical layer, coupled to the EUSB data-link layer, for converting incoming serial data from a EUSB bus interface into input parallel words and for converting output parallel words into outgoing serial data for transmission over the EUSB bus interface; and whereby PCIE data payloads are directly bridged to EUSB without transmission over a physical PCIE bus.

7. The high-level integrated PCIE-to-EUSB bridge of claim 6 wherein the EUSB physical layer further comprises:

a EUSB analog front end having an input connection to a first pair of differential lines and having an output connection to a second pair of differential lines;

a serial-parallel converter, coupled to the EUSB analog front end to receive an input serial bitstream received over the first pair of differential lines, and coupled to output an output serial bitstream for transmission over the second pair of differential lines, for converting the input serial bitstream into input parallel words, and for converting output parallel words into the output serial bitstream; and a frame processor for adding frame bits to the output parallel words, and for removing frame bits from the input parallel words.

8. The high-level integrated PCIE-to-EUSB bridge of claim 7 wherein the EUSB physical layer further comprises:

an encoder for encoding the output serial bitstream with an 8/10 encoding; and a decoder for decoding the input serial bitstream using the 8/10 encoding.

9. The high-level integrated PCIE-to-EUSB bridge of claim 6 wherein the EUSB data-link layer further comprises:

an error-code generator/checker for generating a generated checksum for the input parallel words and for signaling an error when the generated checksum mismatches a transmitted checksum in the input parallel words, and for generating a checksum stored with the output parallel words.

10. The high-level integrated PCIE-to-EUSB bridge of claim 9 wherein the EUSB transaction layer further comprises:

a bulk-only-transport layer processor for inserting a header for a EUSB protocol into the output parallel words, and for extracting the header from the input parallel words.

11. The high-level integrated PCIE-to-EUSB bridge of claim 6 wherein the high-level integrated peripheral component interconnect express to extended universal-serial bus (PCIE-to-EUSB) bridge is integrated with an I/O controller.

12. An extended-bus computer system comprising:

a legacy host that does not have an extended universal-serial bus (EUSB);

an I/O controller on the legacy host, the I/O controller driving a peripheral component interconnect express (PCIE) bus;

a PCIE-to-EUSB bridge, coupled to the PCIE bus and to an EUSB bus;

an EUSB device on the EUSB bus;

a first pair of differential lines coupled between the PCIE-to-EUSB bridge and the EUSB device, for carrying serial packets from the PCIE-to-EUSB bridge to the EUSB device;

a second pair of differential lines coupled between the PCIE-to-EUSB bridge and the EUSB device, for carrying serial packets from the EUSB device to the PCIE-to-EUSB bridge;

a high-level bridging converter module, on the PCIE-to-EUSB bridge, for converting PCIE data payloads into EUSB data payloads;

a PCIE stack of layers, on the PCIE-to-EUSB bridge, for converting physical electrical signals on the PCIE bus into the PCIE data payloads; and an EUSB stack of layers, on the PCIE-to-EUSB bridge, for converting the EUSB data payloads into physical electrical signals on the EUSB bus, whereby the legacy host is extended by the PCIE-to-EUSB bridge to connect to the EUSB device through the PCIE bus.

13. The extended-bus computer system of claim 12 wherein the EUSB bus carries USB packets;

wherein the legacy host does not poll the EUSB device when the EUSB device is waiting to complete a memory access.

14. The extended-bus computer system of claim 12 further comprising:

flash memory means, on the EUSB device, for storing data in non-volatile flash-memory cells wherein data is retained when power is disconnected;

flash interface means, on the EUSB device, for accessing the flash memory means; and sector buffer means, on the EUSB device, for storing output parallel words read from the flash memory means by the flash interface means, and for storing input parallel words before writing to the flash memory means by the flash interface means.

15. The extended-bus computer system of claim 12 wherein the EUSB stack of layers on the PCIE-to-EUSB bridge further comprises:

EUSB analog front end means for sending differential signals on differential lines, the EUSB analog front end means having an input connection to the first pair of differential lines and having an output connection to the second pair of differential lines;

serial-parallel converter means, coupled to the EUSB analog front end means to receive an input serial bitstream received over the first pair of differential lines, and coupled to output an output serial bitstream for transmission over the second pair of differential lines, for converting the input serial bitstream into input parallel words, and for converting output parallel words into the output serial bitstream; and frame processor means for adding frame bits to the output parallel words, and for removing frame bits from the input parallel words.

16. The extended-bus computer system of claim 15 wherein the EUSB stack of layers on PCIE-to-EUSB bridge further comprises:

error-code generator/checker means for generating a generated checksum for the input parallel words and for signaling an error when the generated checksum mismatches a transmitted checksum in the input parallel words, and for generating a checksum stored with the output parallel words; and bulk-only-transport layer processor means for inserting a header for a EUSB protocol into the output parallel words, and for extracting the header from the input parallel words.

17. The extended-bus computer system of claim 16 wherein the PCIE stack of layers on the PCIE-to-EUSB bridge further comprises:

PCIE physical layer means for sensing and driving physical electrical signals on the PCIE bus;

PCIE data link layer means, coupled to the PCIE physical layer means, for adding sequence numbers to outgoing PCIE packets, and for using sequence numbers on incoming PCIE packets to order the incoming PCIE packets into a sequence; and PCIE transaction layer means, coupled to the PCIE data link layer means, for extracting the PCIE data payloads from incoming PCIE packets, and for adding a PCIE header to PCIE data payloads to form the outgoing PCIE packets.

18. The extended-bus computer system of claim 17 wherein the I/O controller further comprises:

a host PCIE stack of layers, for converting host PCIE data payloads from the legacy host into physical electrical signals on the PCIE bus.

19. The extended-bus computer system of claim 18 wherein the host PCIE stack of layers on the I/O controller further comprises:

host PCIE physical layer means for sensing and driving physical electrical signals on the PCIE bus;

host PCIE data link layer means, coupled to the host PCIE physical layer means, for adding sequence numbers to host outgoing PCIE packets, and for using sequence numbers on host incoming PCIE packets to order the host incoming PCIE packets into a sequence; and host PCIE transaction layer means, coupled to the host PCIE data link layer means, for extracting the host PCIE data payloads from host incoming PCIE packets, and for adding a PCIE header to host PCIE data payloads to form the host outgoing PCIE packets.

* * * * *